United States Patent [19]

Fan

[11] 3,971,033

[45] July 20, 1976

[54] METHOD AND APPARATUS FOR APPLYING MAGNETIC LIQUID DROPLETS TO A RECORDING SURFACE

[75] Inventor: George J. Fan, Ossining, N.Y.

[73] Assignee: IBM Corporation, Armonk, N.Y.

[22] Filed: May 27, 1975

[21] Appl. No.: 580,655

[52] U.S. Cl. .......... 346/1; 346/75

[51] Int. Cl.[2] .......... G01D 15/18

[58] Field of Search .......... 346/75, 140, 1

[56] References Cited

UNITED STATES PATENTS

| | | | |
|---|---|---|---|
| 3,510,878 | 5/1970 | Johnson, Jr. | 346/75 X |
| 3,641,588 | 2/1972 | Metz | 346/75 |
| 3,805,274 | 4/1974 | Kashio | 346/75 |
| 3,864,692 | 2/1975 | McDonnell et al. | 346/75 |

*Primary Examiner*—George H. Miller, Jr.
*Attorney, Agent, or Firm*—Frank C. Leach, Jr.

[57] ABSTRACT

A stream of magnetic ink droplets is directed towards a recording surface and initially passes through a selector, which selects the droplets for application to the recording surface to form characters thereon. Each of the selected droplets passes through first and second magnetic deflectors in which each of the selected droplets is deflected in directions orthogonal to each other and orthogonal to the direction in which the droplets are moving toward the recording surface. Each of the selected droplets is subjected to a magnetic field gradient varying with respect to time during the passage of the droplet through one or both of the magnetic fields depending on the desired position of the droplet on the recording surface relative to the prior droplet.

22 Claims, 3 Drawing Figures

METHOD AND APPARATUS FOR APPLYING MAGNETIC LIQUID DROPLETS TO A RECORDING SURFACE

In the formation of characters on a recording surface by the use of ink droplets, it is desired to print the characters as fast as possible for a given velocity of the stream of droplets and a given wave length of the droplets. To increase the print speed for a given velocity and wave length, it is necessary to decrease the number of droplets per character to increase the number of characters per second since the product of the number of droplets per character and the number of characters per second gives the frequency in droplets per second.

However, when printing in the usual raster fashion in which the droplets are moved within a rectangular or square matrix, the reduction of the number of droplets per character causes a decrease in the print quality. Accordingly, it has not been previously possible to increase the print speed for a given velocity and speed by decreasing the number of droplets per character without affecting the print quality.

The present invention satisfactorily solves the foregoing problem of reducing the number of droplets per character without affecting the print quality. The present invention accomplishes this by utilizing most of the droplets supplied rather than causing most of the droplets to be diverted to a gutter and not employed in printing as in the usual raster fashion of printing. Thus, in a raster fashion of printing, less than ten percent of the droplets are normally utilized for printing whereas the present invention contemplates using at least fifty percent of the droplets supplied.

The present invention obtains this high utilization of the droplets through following a given line or curve to its discontinuity and then beginning another separate line or curve, if such is required to form a character, with a minimum number of droplets being diverted to a gutter. In many instances, the present invention forms the character from a single line.

The deflection of the droplet to any desired position on the recording surface is obtained through deflecting the droplet in two orthogonal directions with each of these deflected directions being orthogonal to the direction in which the droplets are moving for their application to the recording surface. Each of the droplets is deflected in at least one direction relative to the prior droplet through deflecting the droplet in at least one of the orthogonal directions.

The concept of deflecting a droplet of ink in two orthogonal directions is shown in U.S. Pat. No. 3,060,429 to Winston wherein electrostatic ink droplets are deflected in orthogonal directions for application to a recording surface. However, in the aforesaid Winston patent, the droplets are only supplied on demand, and a large voltage change is required. The large voltage change is not desirable. Furthermore, the speed at which printing can occur is not only reduced by the large voltage swing or change but also because of the requirement that only one of the droplets be within either of the orthogonal deflectors at any time.

Additionally, in the aforesaid Winston patent, it is comtemplated to print only in a matrix form when utilizing the orthogonal deflectors. That is, the ink droplets can be made to sweep an area on the paper, which is stopped, several times in the vertical direction and be stepped horizontally during each retrace. This is a raster application so that the time to form a character would have to be relatively high.

In U.S. Pat. No. 3,510,878 to Johnson Jr., printing is accomplished through deflecting magnetic liquid droplets in orthogonal directions to position each droplet at a desired position on the recording surface. However, the aforesaid Johnson Jr. patent permits only a single droplet to be within one of the orthogonal deflectors at any time. Thus, the speed at which the mechanical feed valve can be opened and closed limits the speed at which a droplet can be supplied to the orthogonal deflectors so that the speed of printing obtained by the aforesaid Johnson Jr. patent is not economical for printing.

In U.S. Pat. No. 3,691,551 to Kashio, there is shown and described a system for producing signals for generating characters on a cathode ray tube or an ink jet recording apparatus. While the description of the aforesaid Kashio patent is directed to the cathode ray tube, it is stated that the system can be utilized with an ink jet recording device.

In the aforesaid Kashio patent, each of the orthogonal deflectors can have only one of the droplets therein at any specific time. Thus, each of the droplets of an ink jet recording apparatus utilized with the system of the aforesaid Kashio patent depends on an instantaneous current to position the droplet. Therefore, the speed of printing in an ink jet recording apparatus utilizing the system of the aforesaid Kashio patent is limited because of the use of instantaneous currents to provide the signals to deflect the droplet in the orthogonal directions. That is, the velocity with which the droplets move through the deflector must be such that only one of the droplets is in a deflector at any time and is present for a sufficient period of time to obtain the desired deflection.

The present invention overcomes the problems of the aforesaid patents in that high speed printing through deflecting the droplet in two orthogonal directions is obtained. The present invention accomplishes this by forming each of the orthogonal deflectors of sufficient length so that a plurality of droplets is present within each of the orthogonal deflectors at any time. By varying with respect to time the gradient of the magnetic field being applied to the droplets to deflect them in the orthogonal directions, an average magnetic field gradient is applied to each of the droplets so that a continuous line, either straight or curved, is produced.

Accordingly, it is not necessary to utilize only a single droplet at a time within a deflector in the present invention as is required by the aforesaid patents. There also is not a relatively low printing speed as occurs with any of the aforesaid patents.

An object of this invention is to provide a method and apparatus for increasing the print speed of a magnetic ink jet without a decrease in print quality.

Another object of this invention is to provide a method and apparatus for magnetic ink jet printing in which the required supply of droplets per character is reduced.

The foregoing and other objects, features, and advantages of the invention will be apparent from the following more particular description of preferred embodiments of the invention, as illustrated in the accompanying drawings.

Figure 1:
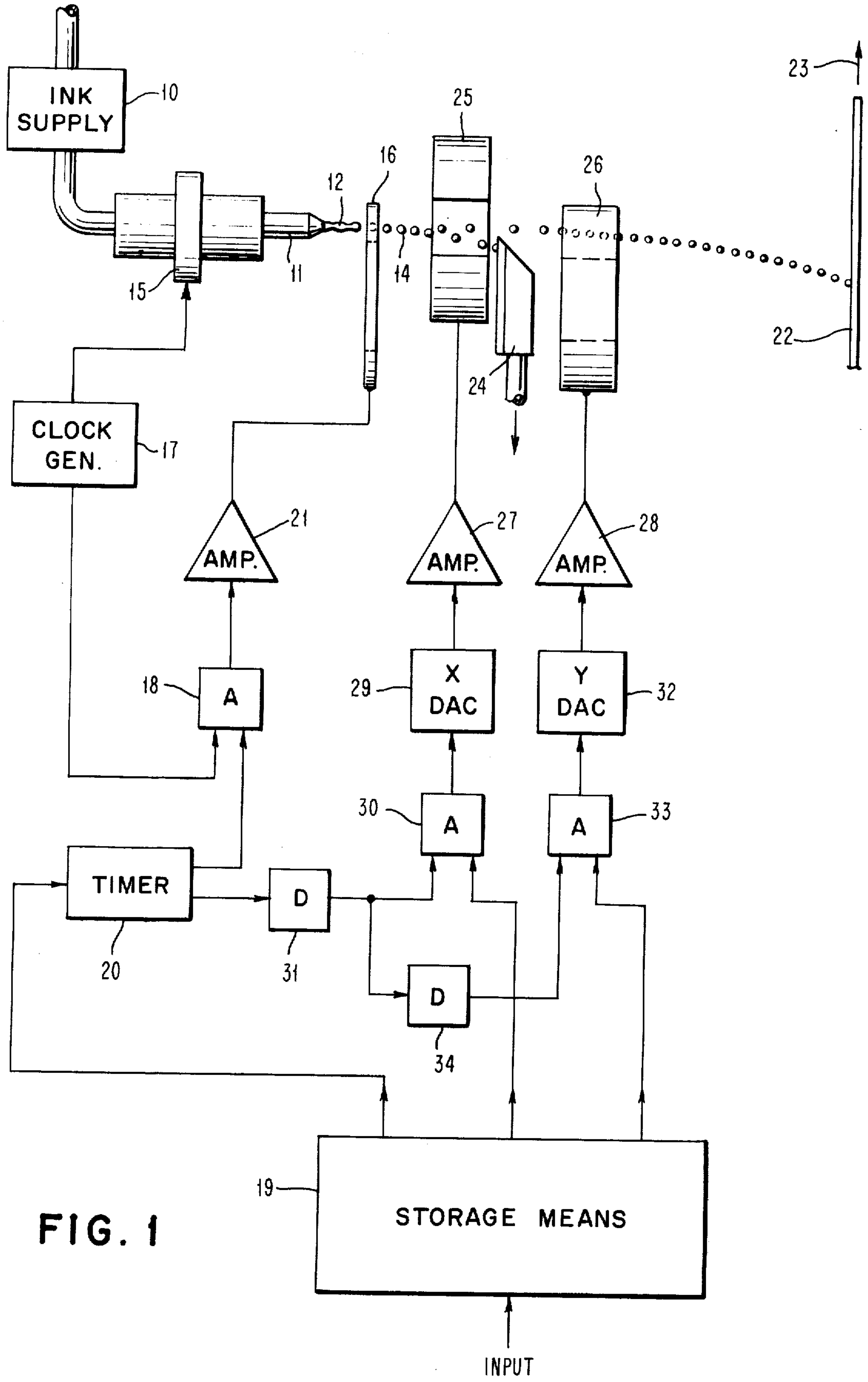
FIG. 1 is a schematic diagram of one form of the apparatus of the present invention.

Referring to the drawings and particularly FIG. 1, there is shown an ink supply 10 of magnetic ink. The magnetic ink may be any suitable magnetic ink, which is preferably isotropic and virtually free of remanence. One suitable example of the magnetic ink is a ferrofluid of the type described in U.S. Pat. No. 3,805,272 to Fan et al.

The ink supply 10 supplies magnetic ink to a nozzle 11 under pressure from which the ink issues as a stream 12 of droplets 14 due to the nozzle 11 being subjected to vibration from a transducer such as a piezoelectric transducer 15. The transducer 15 produces the stream 12 of the droplets 14 at a desired frequency and a desired wave length.

After the droplets 14 are formed, they pass through a selector 16, which has a length less than the wave length of the droplets 14 so that only one of the droplets 14 is in the selector 16 at any time. The selector 16 can be a C-shaped electromagnet, for example. It is only necessary that the selector 16 be capable of selectively applying a magnetic field to any of the droplets 14 as they pass therethrough.

A clock generator 17 controls the frequency with which the droplets 14 are produced. The clock generator 17 is connected to the transducer 15 to cause it to vibrate at the desired frequency through supply of pulses from the clock generator 17 at the desired frequency.

The output pulses from the clock generator 17 also are supplied to an AND gate 18, which receives its other input from a storage means 19. When a current pulse is supplied to the AND gate 18 due to a signal from the storage means 19 being supplied to a timer 20, the AND gate 18 allows the current pulse from the timer 20 to flow therethrough to a current amplifier 21 from which it is supplied to the selector 16. Thus, when the current is supplied to the selector 16, the droplet 14 passing therethrough is magnetized to cause it to have a path in which it will strike a recording surface 22, which is continuously moving in the direction indicated by an arrow 23.

If the droplet in the selector 16 is not to be selected for printing on the recording surface 22, then there is no current supplied to the AND gate 18 by the storage means 19 when the clock generator 17 supplies a pulse to the AND gate 18. As a result, the AND gate 18 does not open and the selector 16 does not magnetize the droplet 14 therein. Accordingly, this droplet 14 strikes a gutter 24 during its movement toward the recording surface 22.

It should be understood that the gutter 24 could be arranged to intercept the droplets 14 which have been magnetized in the selector 16 rather than those that have not. Thus, with the gutter 24 so disposed, current would be supplied through the AND gate 18 to the selector 16 only when the droplet 14 therein is not to be selected for printing on the recording surface 22.

After the droplet 14 has been selected by the selector 16 for application to the recording surface 22, the droplet 14 continues to move in the direction in which it was directed from the nozzle 11 toward the recording surface 22 through a pair of deflectors 25 and 26, which deflect the droplets 14 in directions orthogonal to each other and to the direction in which the droplet 14 is moving toward the recording surface 22. Accordingly, the deflector 25, which deflects in the X direction, and the deflector 26, which deflects in the Y direction, are disposed along the path of the droplet 14 from the selector 16 to the recording surface 22.

One of the deflectors 25 and 26 deflects the droplet 14 in the same direction as that in which the recording surface 22 is moving. Thus, when the recording surface 22 is moving in the direction of the arrow 23, the Y deflector 26 deflects the droplet 14 in the same direction.

Each of the deflectors 25 and 26 can be a wedge-shaped electromagnet of the type shown and described in the aforesaid Fan et al patent, for example. Any other suitable electromagnets may be utilized as the deflectors 25 and 26. It is only necessary that the electromagnets be responsive to a current to produce a desired magnetic field gradient in the desired direction on each of the droplets 14 passing therethrough.

Each of the deflectors 25 and 26 preferably contains as few of the droplets 14 as possible. As an example, each of the deflectors 25 and 26 has a length equal to five times the wave length of the droplets 14. As a result, five of the droplets 14 can be within the deflector 25 or 26 at any time. Thus, when it is necessary to cease printing along a line and move to print another line to form part of the same character, the discontinuity is equal to only the number (five) of the droplets 14 within the deflector 25 or 26. This is because directing five of the droplets 14 from the stream 12 to the gutter 24 clears each of the deflectors 25 and 26 of the droplets 14.

The clearing of each of the deflectors 25 and 26 of the droplets 14 when ceasing to print one line and moving to print another line to form part of the same character eliminates the problem of having to make large shifts in the magnitudes of the currents supplied to the deflector 25 or 26. If the deflectors 25 and 26 were not cleared of the droplets 14 when shifting a substantial distance between printing points, a current having a very large differential in comparison with the previous current magnitude would have to be supplied when the droplet 14, which is the first droplet to be applied to the recording surface 22 as part of the new line, enters the deflector 25 or 26. This would affect the average deflection applied to the droplets 14 already in the deflector 25 or 26 to such an extent that they would not be deflected to the desired positions on the recording surface 22.

Therefore, whenever the line being printed ends and there is a shift to start another line, there must be diversion to the gutter 24 of the number of the droplets 14 equal to those in the deflector 25 or 26. When this occurs, the first of the droplets 14 entering the deflector 25 to form the new line will have a large current relative to the prior current, for example, supplied thereto. Since all of the droplets 14 forming the prior line have left the deflector 25, there is no effect on them. A similar arrangement exists when the same first droplet 14 enters the deflector 26.

As each of the droplets 14 enters the deflector 25, a current is supplied thereto through a current amplifier 27. Similarly, when the same droplet 14 enters the deflector 26, a current is supplied thereto through a current amplifier 28. Thus, current supplied to each of the deflectors 25 and 26 must be timed in conjunction with the particular droplet 14 entering each of the deflectors 25 and 26 at different times. Furthermore, the current to the deflector 25 must be for the droplet 14 which has previously been selected in the selector 16.

Accordingly, suitable delay means must be provided so that the signal from the storage means 19 to select the particular droplet 14 through the selector 16 is later supplied to the deflector 25 for the same droplet 14 and still later supplied to the deflector 26 for the same droplet 14. This signal causes the desired current magnitudes to be supplied to each of the deflectors 25 and 26.

The current supplied to the current amplifier 27 is from a digital to analog converter (DAC) 29, which produces a current in accordance with the signal supplied thereto from the storage means 19 through an AND gate 30. The gate 30 allows the signal to pass from the storage means 19 to the DAC 29 when the current pulse which is supplied from the timer 20 to the gate 18 reaches the gate 30 through a delay means 31. The delay means 31 insures that the DAC 29 does not supply the current to the deflector 25 until the droplet 14 which has been selected in the selector 16 by the current pulse from the timer 20 has reached the deflector 25.

The current for the deflector 26 is supplied from a digital to analog converter (DAC) 32, which also receives a signal from the storage means 19 and produces a current pulse having a magnitude in accordance with the signal from the storage means 19 for the deflector 26. The signal from the storage means 19 is supplied to the DAC 32 through an AND gate 33. The AND gate 33 receives its other input from a delay means 34, which is connected to the output of the delay means 31. The delay means 34 delays the signal from the storage means 19 to the DAC 32 until the droplet 14, which was selected in the selector 16 by the current pulse from the timer 20 that is supplied through the delay means 31 and 34 to the gate 33, has reached the deflector 26. Then, the DAC 32 supplies the current to the deflector 26.

Since writing of the characters on the recording surface 22 is to occur through lines, which can be straight or curved, a plurality of the droplets 14 is selected in the selector 16 and directed through the deflectors 25 and 26 for appropriate deflection prior to engaging the recording surface 22. That is, the storage means 19 produces a plurality of signals in accordance with the input thereto. Thus, the storage means 19 selects the number of the droplets 14 to be selected in the selector 16 for the particular character and determines the magnitude of the current to each of the deflectors 25 and 26 for each of the selected droplets 14. Furthermore, if the selected character has a discontinuity in the lines forming it such as the character T, for example, then the signal from the storage means 19 also includes signals to direct five of the droplets 14, which are equal to the number of the droplets 14 in the deflector 25 or 26, to the gutter 24 when one of the lines forming the character T has been printed and prior to printing the other of the lines forming the character T.

Accordingly, with the deflector 25 having a length equal to five times the wave length of the droplets 14, five of the droplets 14 are within the deflector 25 and five other of the droplets 14 are within the deflector 26 at any one time. Thus, each of the droplets 14 in the deflector 25 or 26 has a deflection relative to the prior selected droplet 14 in the direction in which the deflector 25 or 26 deflects unless the adjacent droplets 14 are to record a straight line on the recording surface 22 in the same direction as the deflector 25 or 26 deflects. When this occurs, there is no change in the magnitude of the current supplied from the DAC 29 to the deflector 25 or from the DAC 32 to the deflector 26 depending upon which direction the straight line extends. That is, if the line extends in the X direction, then only the deflector 26 has no change in the magnitude of current supplied thereto whereas if the line extends in the Y direction, then only the deflector 25 has no change in the magnitude of the current supplied thereto.

Accordingly, as the droplet 14 moves through the deflector 25, for example, and the character being formed is not a straight line, then the magnitude of the current supplied from the DAC 29 to the deflector 25 for each of the droplets 14 entering the deflector 25 is different. Thus, the magnetic field gradient acting on one of the droplets 14 during its transit through the deflector 25 is produced by an average of the magnitudes of the currents supplied to the deflector 25 for the five droplets 14 entering the deflector 25 during the transit of the droplet 14, which is the droplet deflected in accordance with this average gradient, through the deflector 25.

Thus, the deflection applied to the droplet 14 during its transit through the deflector 25 is an average deflection corresponding to the average of the magnitudes of the currents supplied to the deflector 25 during the time that the droplet 14 is within the deflector 25. Therefore, an average deflection over the transit time of the droplet 14 in the deflector 25 is obtained.

Because of this change in the magnitudes of the currents supplied to the deflector 25 during the time that the droplet 14 is passing therethrough, a continuously varying magnetic field gradient is applied to the droplet 14 if the droplet 14 is to have a different position in the X direction on the recording surface 22 than the prior droplet 14 passing through the deflector 25. Thus, even the last of the droplets 14, which forms a line so that there is a shift in position after this last of the droplets 14 is applied to the recording surface 22 whereby the next five droplets 14 are not applied to the recording surface 22, has a continuously varying magnetic field gradient applied thereto when it is to have a different position on the recording surface 22 in the X direction than the prior droplet 14 passing through the deflector 25. These current signals are supplied from the storage means 19.

Accordingly, when the last of the droplets 14 forming the line exits from the deflector 25, there is a sudden shift in the magnitude of the current supplied to the deflector 25 so that the droplet 14, which is now entering the deflector 25 and is to be applied to the recording surface 22 to start the new line, begins to have the desired magnetic field gradient applied thereto to deflect the entering droplet 14 to the desired position in the X direction on the recording surface 22. Since the five droplets between the last of the droplets 14 to form the end of the prior line and the droplet 14 to form the start of the new line are deflected to the gutter 24 and not applied to the recording surface 22, it is immaterial that the gutter 24 is between the deflectors 25 and 26. The failure to select the droplet 14 by the selector 16 insures that the droplets 14, which are not to strike the recording surface 22, will be directed to the gutter 24 irrespective of any deflection applied thereto by the deflector 25 during the passage of the droplets 14 therethrough.

While the gutter 24 has been shown as being disposed between the deflectors 25 and 26, it should be understood that the gutter 24 could be positioned prior to the deflector 25. This would require a larger current to the selector 16 to insure that the selected droplets 14 do not strike the gutter 24.

The deflector 26 functions in the same manner. Of course, the particular droplet 14, which has been deflected in the deflector 25, arrives at a later time at the deflector 26 and the signal to the DAC 32 from the storage means 19 for the particular droplet 14 has been delayed by the delay means 34 in comparison with the signal supplied to the DAC 29.

With the recording surface 22 moving relative to the deflectors 25 and 26, one of the deflectors 25 and 26 has a ramp current supplied thereto as part of the total current from the corresponding DAC 29 or 32 so that there is correction or compansation for the relative motion of the recording surface 22 with respect to the deflectors 25 and 26. With the arrow 23 in the Y direction, the compensation or correction current is supplied to the deflector 26 from the DAC 32.

If the recording surface 22 were to move in a direction orthogonal to the arrow 23, then the deflector 25 would have the correction or compensation current supplied thereto from the DAC 29. Furthermore, motion of the recording surface 22 could be other than in one of the orthogonal deflection directions produced by the deflectors 25 and 26. This would require a correction or compensation current to each of the deflectors 25 and 26.

While the recording surface 22 has been shown as moving relative to the deflectors 25 and 26, it should be understood that the recording surface 22 could be stationary and the deflectors 25 and 26, the selector 16, and the ink droplet forming device be movable relative to the recording surface 22. The same type of corrections or compensations would be necessary.

If desired, the recording surface 22 could be incremented between the application of the droplets 14 thereto. This would eliminate the necessity for any correction for relative motion of the recording surface 22, but it would reduce the printing speed.

If it is desired to form the character T, for example, on the recording surface 22, a different magnitude of current would be supplied to the deflector 25 for each of the droplets 14 which are to be used to form the bar of the character T as it enters the deflector 25. By the time that the first droplet 14 forming the bar of the character T has left the deflector 25, it has been subjected to varying magnetic field gradients because of the change in the magnitudes of the currents from the DAC 29.

When the first of the droplets 14 forming the bar of the character T enters the deflector 26 after having been deflected the necessary amount in the X direction in the deflector 25, the magnitude of the current to the deflector 26 during the passage of this first of the droplets 14 through the deflector 26 does not vary except for correction for motion of the recording surface 22. Since each of the droplets 14 will be disposed on the same horizontal line and it is not desired that they be displaced in the Y or vertical direction, the magnetic field gradient on the droplet 14 in the deflector 26 during its passage through the deflector 26 varies only for the compensation for the motion of the recording surface 22.

When the base of the character T is to be formed, there is no change in the magnetic field gradient applied to the droplets 14 in the deflector 25 because they are disposed on a straight vertical line with no shift in the X or horizontal direction. However, all of these droplets 14 are subjected to a varying magnetic field gradient with respect to time during their transit through the deflector 26 to displace the droplets 14 in the Y direction to form the base of the character T. There also is the correction for motion of the recording surface 22 in the direction of the arrow 23.

After the last of the droplets 14 to be used to form the bar of the character T has passed the selector 16, the next five droplets are directed to the gutter 24 by the selector 16 not being magnetized. This is because of the necessity to avoid a large change in the average current supplied to at least one of the deflectors 25 and 26.

If it is desired to form a curved character such as the character C, then each of the deflectors 25 and 26 has a continuously varying magnetic field gradient applied to each of the droplets 14 during the transit of each of these droplets 14 through each of the deflectors 25 and 26. This is because each of the droplets 14 is disposed on the recording surface 22 at another position in the X and Y directions relative to the prior selected droplet 14.

Figure 2:
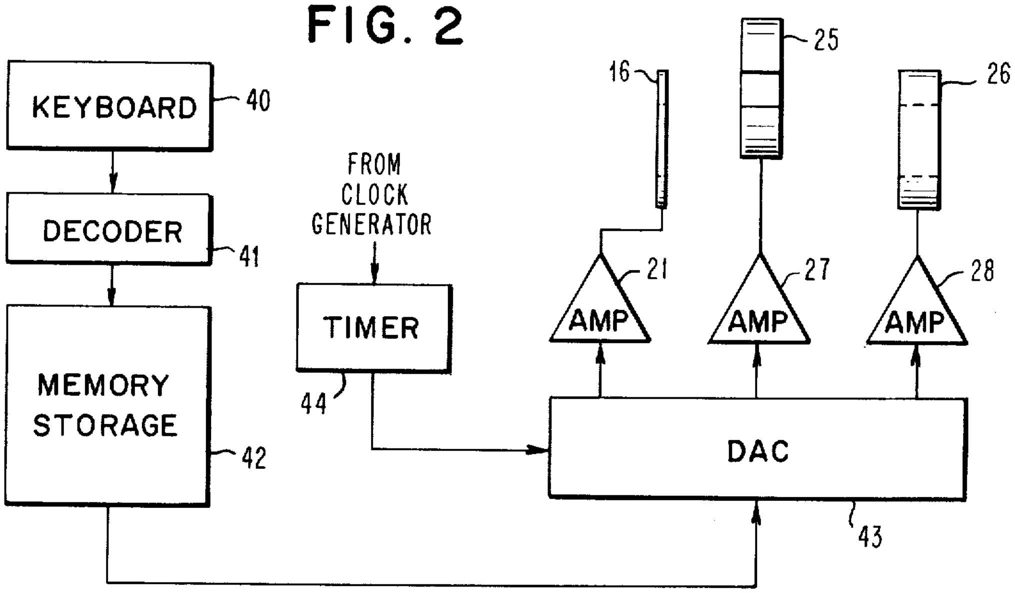
FIG. 2 is a schematic diagram showing another embodiment of a portion of the apparatus of the present invention.

Referring to FIG. 2, there is shown another form of control system for use with the selector 16, the deflector 25, and the deflector 26. In this arrangement, a keyboard 40 is connected to a decoder 41 so that the input from the keyboard 40 is decoded by the decoder 41 to supply a signal to a memory storage 42.

The memory storage 42 supplies stored signals, which represent the input, to a digital to analog converter (DAC) 43. The DAC 43 converts the digital signals from the memory storage 42 to analog signals for supply as currents to the current amplifiers 21, 27, and 28.

A timer 44, which is controlled in accordance with the output pulses from the clock generator 17 of FIG. 1, controls when the output signals from the DAC 43 are supplied to the selector 16, the deflector 25, and the deflector 26 through the current amplifiers 21, 27, and 28, respectively. The timer 44 insures that the analog signal from the DAC 43 to the deflector 25 is delayed until the droplet 14, which has been selected in the selector 16 in conjunction with the signal from the DAC 43, arrives at the deflector 25. Similarly, the timer 44 insures that the signal from the DAC 43 is not supplied to the deflector 26 until the droplet 14, which has been selected at the selector 16, has passed through the deflector 25 and arrived at the deflector 26. The operation is the same as that described for FIG. 1.

Figure 3:
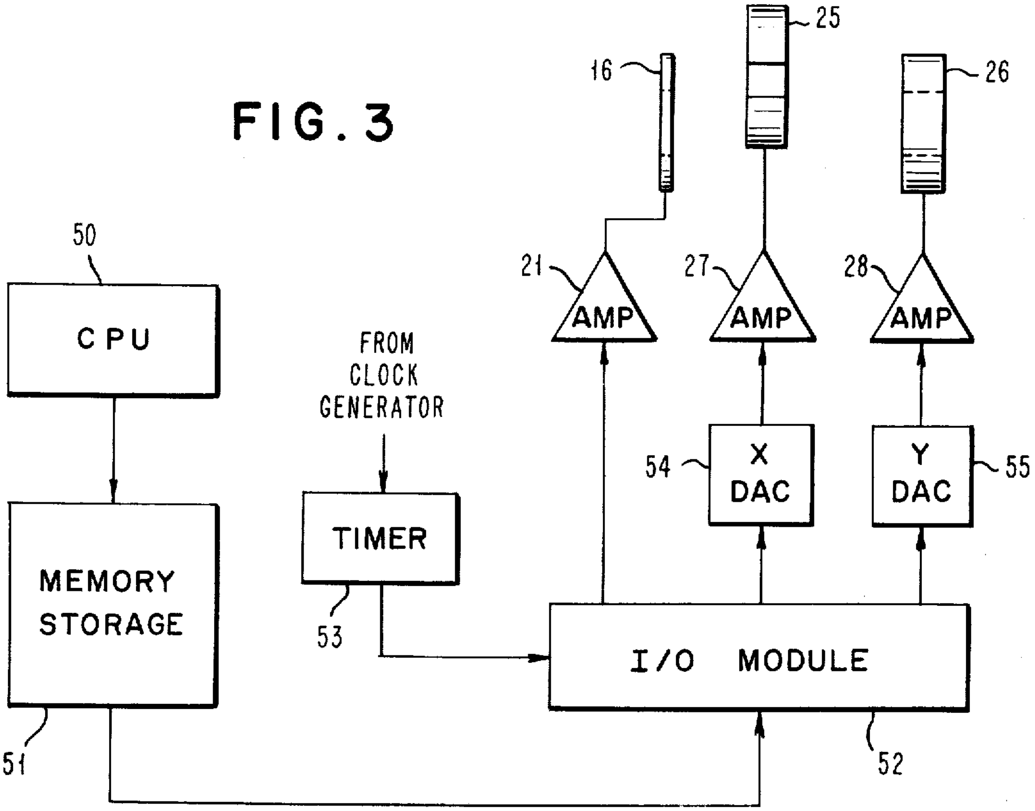
FIG. 3 is a schematic diagram showing a further modification of a portion of the apparatus of the present invention.

Referring to FIG. 3, there is shown another form of control system for supplying currents to the selector 16 and the deflectors 25 and 26. In this arrangement, a computer processing unit (CPU) 50 is connected to a memory storage 51.

The signals from the CPU 50 cause the memory storage 51 to supply digital bits of information to an input-output module 52. The memory storage 51 supplies selection bits to the module 52 for supply to the selector 16 through the current amplifier 21, a first deflection bit sequence for supply to the deflector 25 through the current amplifier 27, and a second deflection bit sequence for supply to the deflector 26 through the current amplifier 28.

The input-output module 52 has a timer 53 connected thereto for controlling when the selection bit is initially supplied to the selector 16, the first deflection bit sequence is initially supplied to the deflector 25, and the second deflection bit sequence is initially supplied to the deflector 26. The timer 53 is controlled by the clock generator 17 so that the selection bit is initially supplied from the module 52 through the current amplifier 21 to the selector 16 to cause selection of the first droplet 14 in the selector 16 for printing on the recording surface 22.

The timer 53 delays the first deflection bit sequence, which is supplied to the deflector 25 through a digital to analog converter (DAC) 54, to the deflector 25 until the droplet 14, which has been first selected in the selector 16, enters the deflector 25. The timer 53 causes a further delay of the second deflection bit sequence, which is supplied to the deflector 26 through a digital to analog converter (DAC) 55, to the deflector 26 until the droplet 14, which has been initially selected in the selector 16, enters the deflector 26.

Thus, the timer 53 controls the input-putput module 52 so that the signals for a particular one of the droplets 14 are appropriately delayed. The operation of FIG. 3 is the same as described for FIG. 1.

One suitable example of the DACs is sold by Fairchild Semiconductor Industries as model DAC 20 Series D/A Converter. Any other suitable DAC could be employed.

While the deflectors 25 and 26 have been shown as having five of the droplets 14 therein, it should be understood that the number of the droplets 14 within each of the deflectors 25 and 26 may be more or less than five depending on the length of time it is desired to average the magnetic deflection applied to each of the droplets 14. This change in the number of the droplets 14 in each of the deflectors 25 and 26 would result in the deflectors 25 and 26 having their lengths changed to accommodate either more or less of the droplets 14 than five. Of course, each of the deflectors 25 and 26 is of the same length and has the same number of the droplets 14 therein.

While the present invention has shown the deflectors 25 and 26 as being separate and spaced from each other, it should be understood that the varying magnetic field gradients in both the X and Y directions could be produced by a single cross field transducer, which would replace the deflectors 25 and 26. Thus, the deflections in both orthogonal directions would be produced by the magnetic field gradients of the cross field transducer.

It should be understood that the cross field transducer, which is an electromagnet, has three separate legs so that three different signals must be supplied to the transducer to enable the magnetic field gradients to vary, as desired, in the X and Y directions. Thus, it would be necessary to change the control system to supply three signals to the cross field transducer rather than the two signals supplied to the deflectors 25 and 26.

An advantage of this invention is that it increases print speed without decreasing print quality. Another advantage of this invention is that it reduces the number of droplets per character. A further advantage of this invention is that a continuous line segment can be produced. Still another advantage of this invention is that any corner can be turned to produce a line.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for applying droplets of a magnetic liquid to a recording surface to form characters thereon including:

means to produce a stream of magnetic ink droplets and projecting same toward the recording surface in a first direction;

means to select one or a series of droplets from the stream for application to the recording surface to form thereon a character or a portion of a character when there is a discontinuity in the formation of the character;

means to selectively apply orthogonal magnetic deflections along two axes to each of the selected droplets to deflect the selected droplets along two orthogonal axes with each of the two orthogonal axes being orthogonal to the first direction;

said selectively applying means having a length to have at least two of the series selected droplets within said selectively applying means at any time;

said selectively applying means including means to selectively deflect each of the series selected droplets by applying magnetic field gradients along the two orthogonal axes with the gradient along at least one of the orthogonal axes varying with respect to time during the passage of each of the series selected droplets therethrough in accordance with the desired position of the series selected droplet on the recording surface with respect to the position of the prior series selected droplet on the recording surface to change the position of the series selected droplet on the recording surface with respect to the prior series selected droplet in either direction along at least the one orthogonal axis;

and means to render said droplet select means ineffective when a character is completed or there is a discontinuity in the formation of a character after forming a portion of the character for a period of time to cause a series of droplets to not be selected and to be equal to the maximum number of the droplets within said selectively applying means at any time and subjected to a varying gradient along one of the orthogonal axes.

2. The apparatus according to claim 1 in which there is continuous relative movement between the recording surface and said selectively deflecting means and means supplies a compensation signal to said selectively deflecting means to compensate for the continuous relative movement.

3. The apparatus according to claim 1 including control means to control the magnetic field gradients along the two orthogonal axes with respect to time by making any change in the magnetic field gradient along one of the two orthogonal axes in conjunction with each of the selected droplets entering the magnetic field gradient along the one orthogonal axis and to control the magnetic field gradient along the other of the two orthogonal axes with respect to time by making any change in the magnetic field gradient along the other orthogonal axis in conjunction with each of the selected droplets entering the magnetic field gradient along the other orthogonal axis.

4. The apparatus according to claim 1 in which said selectively deflecting means includes:

first and second magnetic means spaced from each other in the first direction and having each of the selected droplets pass therethrough;

each of said first and second magnetic means having a length to have the same maximum number of the series selected droplets therein at any time and the maximum number of the series selected droplets in either of said first magnetic means or said second magnetic means is equal to the number of droplets in series not to be selected by said droplet select means when said rendering means renders said droplet select means ineffective;

said first magnetic means adapted to selectively deflect each of the selected droplets along a first axis orthogonal to the first direction, said first magnetic means applying a magnetic field gradient varying with respect to time during the passage of each series selected droplet therethrough when the droplet is to change its position on the recording surface in either direction along the first axis with respect to the prior series selected droplet;

and said second magnetic means adapted to selectively deflect each of the selected droplets along a second axis orthogonal to the first direction and the first axis, said second magnetic means applying a magnetic field gradient varying with respect to time during the passage of each series selected droplet therethrough when the series selected droplet is to change its position on the recording surface in either direction along the second axis with respect to the prior series selected droplet to cooperate with any deflection applied by said first magnetic means to deflect each series selected droplet to its desired position on the recording surface.

5. The apparatus according to claim 4 in which there is continuous relative movement between the recording surface and said first and second magnetic means and means supplies a compensation signal to at least one of said first and second magnetic means to compensate for the continuous relative movement.

6. The apparatus according to claim 5 in which the continuous relative movement is parallel to one of the first and second axes and said compensation signal supply means supplies the compensation signal to only one of said first and second magnetic means.

7. The apparatus according to claim 4 including control means to control the gradient of the magnetic field of said first magnetic means with respect to time by making any change in the gradient of the magnetic field of said first magnetic means in conjunction with each of the selected droplets entering said first magnetic means and to control the gradient of the magnetic field of said second magnetic means with respect to time by making any change in the gradient of the magnetic field of said second magnetic means in conjunction with each of the selected droplets entering said second magnetic means.

8. The apparatus according to claim 7 in which there is continuous relative movement between the recording surface and said first and second magnetic means and means supplies a compensation signal to at least one of said first and second magnetic means to compensate for the continuous relative movement.

9. The apparatus according to claim 8 in which the continuous relative movement is parallel to one of the first and second axes and said compensation signal supply means supplies the compensation signal to only one of said first and second magnetic means.

10. The apparatus according to claim 4 including:

storage means to store signals for supply to each of said first and second magnetic means during the time that each of the selected droplets passes through each of said first and second magnetic means in accordance with the position to which each of the selected droplets is to be deflected;

and means to supply a stored signal from said storage means to each of said first and second magnetic means in conjunction with each of the selected droplets entering each of said first and second magnetic means to produce the magnetic field having its gradient vary with respect to time during passage of each of the selected droplets therethrough.

11. The apparatus according to claim 10 including means to delay the signal for each of the selected droplets to one of said first and second magnetic means relative to the other of said first and second magnetic means so that the signal to each of said first and second magnetic means is supplied in conjunction with each of the selected droplets entering each of said first and second magnetic means.

12. The apparatus according to claim 11 in which there is continuous relative movement between the recording surface and said first and second magnetic means and means supplies a compensation signal to at least one of said first and second magnetic means to compensate for the continuous relative movement.

13. The apparatus according to claim 12 in which the continuous relative movement is parallel to one of the first and second axes and said compensation signal supply means supplies the compensation signal to only one of said first and second magnetic means.

14. A method for applying droplets of a magnetic liquid to a recording surface to form characters thereon including:

producing a stream of magnetic liquid droplets and projecting same toward the recording surface in a first direction;

selecting one or a series of droplets from the stream for application to the recording surface to form thereon a character or a portion of a character when there is a discontinuity in the formation of the character;

directing the selected droplets through orthogonal magnetic field gradients;

selecting the length of the orthogonal magnetic field gradients to have at least two of the series selected droplets within the orthogonal magnetic field gradients at any time;

selectively varying the gradient along at least one of the orthogonal axes with respect to time during the passage of each of the series selected droplets therethrough in accordance with the desired position of the series selected droplet on the recording surface with respect to the position of the prior series selected droplet on the recording surface to change the position of the series selected droplet on the recording surface with respect to the prior series selected droplet in either direction along at least the one orthogonal axis;

and causing a series of droplets equal to the maximum number of the series selected droplets that can be within the orthogonal magnetic field gradients at any time and subjected to a varying gradient along one of the orthogonal axes to be diverted from application to the recording surface when a character is completed or there is a discontinuity in the formation of a character after forming a portion of the character.

15. The method according to claim 14 including:

producing continuous relative movement between the recording surface and the magnetic field gradients through which the selected droplets are directed;

and changing the gradient along at least one of the orthogonal axes to compensate for the continuous relative movement.

16. The method according to claim 14 including controlling the magnetic field gradients along the two orthogonal axes with respect to time by making any change in the magnetic field gradient along one of the two orthogonal axes in conjunction with each of the selected droplets entering the magnetic field gradient along the one orthogonal axis and by making any change in the magnetic field gradient along the other of the two orthogonal axes in conjunction with each of the selected droplets entering the magnetic field gradient along the other orthogonal axis.

17. The method according to claim 14 including:

directing the selected droplets through first and second magnetic fields spaced from each other in the first direction;

selecting the length for each of the first and second magnetic fields to have the same maximum number of the series selected droplets therein at any time;

selectively applying the first magnetic field to each of the selected droplets to deflect each of the selected droplets along a first axis orthogonal to the first direction, varying the gradient of the first magnetic field with respect to time during the passage of each of the series selected droplets through the field when the series selected droplet is to change its position on the recording surface in either direction along the first axis with respect to the prior series selected droplet;

and selectively applying the second magnetic field to each of the selected droplets to deflect each of the selected droplets along a second axis orthogonal to the first direction and the first axis, varying the gradient of the second magnetic field with respect to time during the passage of each of the series selected droplets through the field when the series selected droplet is to change its position on the recording surface in either direction along the second axis with respect to the prior series selected droplet to cooperate with any deflection applied by the first magnetic field to deflect each series selected droplet to its desired position on the recording surface.

18. The method according to claim 17 including:

producing continuous relative movement between the recording surface and the first and second magnetic fields;

and changing the gradient of at least one of the first and second magnetic fields to compensate for the continuous relative movement.

19. The method according to claim 18 in which:

the continuous relative movement is parallel to one of the first and second axes;

and the gradient of only one of the first and second magnetic fields is changed to compensate for the continuous relative movement.

20. The method according to claim 17 including:

controlling the gradient of the first magnetic field with respect to time by making any change in the gradient of the first magnetic field in conjunction with each of the selected droplets entering the first magnetic field;

and controlling the gradient of the second magnetic field with respect to time by making any change in the gradient of the second magnetic field in conjunction with each of the selected droplets entering the second magnetic field.

21. The method according to claim 20 including:

producing continuous relative movement between the recording surface and the first and second magnetic fields;

and changing the gradient of at least one of the first and second magnetic fields to compensate for the continuous relative movement.

22. The method according to claim 21 in which:

the first and continuous relative movement is parallel to one of the second axes;

and the gradient of only one of the first and second magnetic fields is changed to compensate for the continuous relative movement.

* * * * *